Jan. 21, 1958 S. H. EDGE ET AL 2,820,372
CONTROL VALVE FOR FLUID PRESSURE REMOTE CONTROL SYSTEMS
Filed Feb. 2, 1955 2 Sheets-Sheet 1

Inventors
Stanley Howard Edge
Harold Jeffery
By
Attorneys

Inventors
Stanley Howard Edge
Harold Jeffery
By Norris & Bateman
Attorneys

United States Patent Office 2,820,372
Patented Jan. 21, 1958

2,820,372

CONTROL VALVE FOR FLUID PRESSURE REMOTE CONTROL SYSTEMS

Stanley H. Edge and Harold Jeffery, Lincoln, England, assignors to Clayton Dewandre Company Limited, Lincoln, England, a British company Application February 2, 1955, Serial No. 485,636

Claims priority, application Great Britain February 2, 1954

4 Claims. (Cl. 74—471)

This invention relates to fluid pressure control valves for the selective operation of a plurality of remote fluid pressure actuated devices, and of the kind wherein a manually displaceable control member is common to the selective operation of a plurality of valve elements.

Known selector valve mechanisms of this type commonly employ mechanical means interposed between a manual control member and its associated valve elements to displace a selected valve element positively in one operative direction only, the return motion of the element being effected by fluid pressure, spring biassing means or both. If reciprocatory valve elements in the form of ported pistons or sleeves are employed with an operating mechanism of this kind the desired rapid and complete return stroke of an operated valve element may be adversely affected by the frictional resistance offered by the fluid sealing means associated with the sliding valve surfaces.

This resistance may be increased by extreme temperature conditions or by lack of suitable lubrication and may result in the possibility of the operator selecting for operation a successive valve element before the previously operated member has fully returned.

The provision of returning forces of greater strength does not always overcome the aforesaid tendency but usually results in the demand for increased physical effort from the operator. One object of the present invention is to provide a fluid pressure selector control valve of the kind described having elements operated in a positive manner by means responsive to the movements of a manual control member.

A further object is to provide a selector control valve of the aforesaid kind which is of simple and economical construction and which requires a minimum of physical effort for its operation.

According to the invention a fluid pressure selector control valve of the kind referred to is provided with pivotable members adapted to connect adjacent valve elements into coupled pairs and a control member capable of being manually displaced into engagement with any desired one of said pivotable members and of being actuated in a manner such as to rock that pivotable member and thereby reciprocate in opposite direction the valve elements connected thereto.

Reference will now be made to the accompanying drawings wherein

Figures 1, 2:
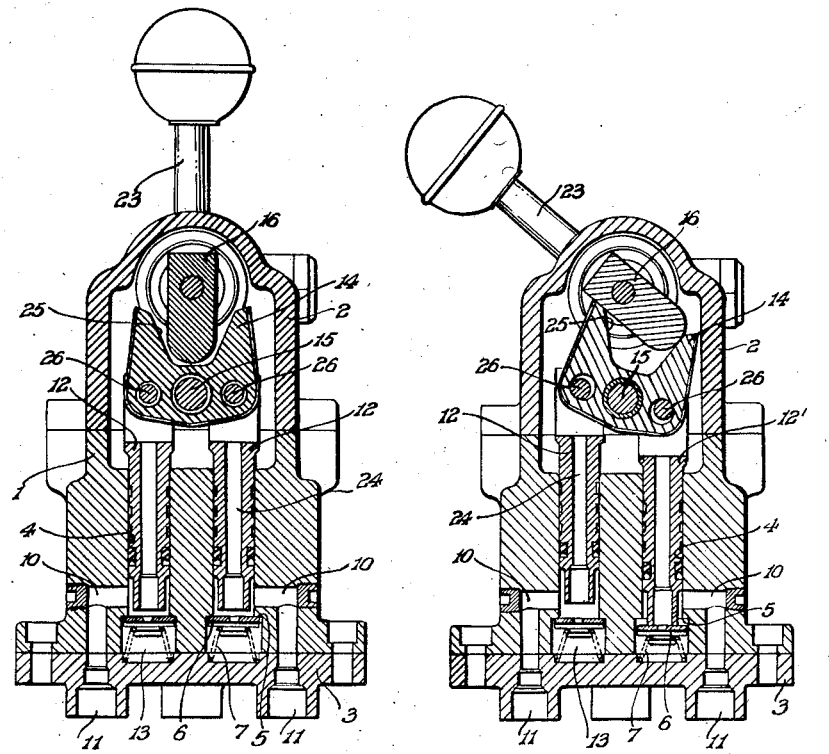
Figure 3:
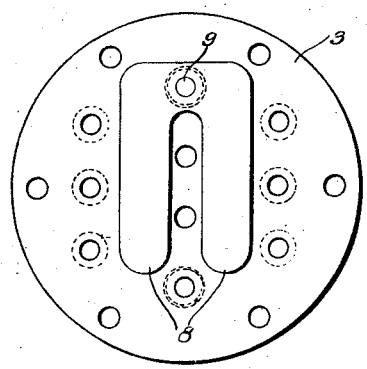
Figure 4:
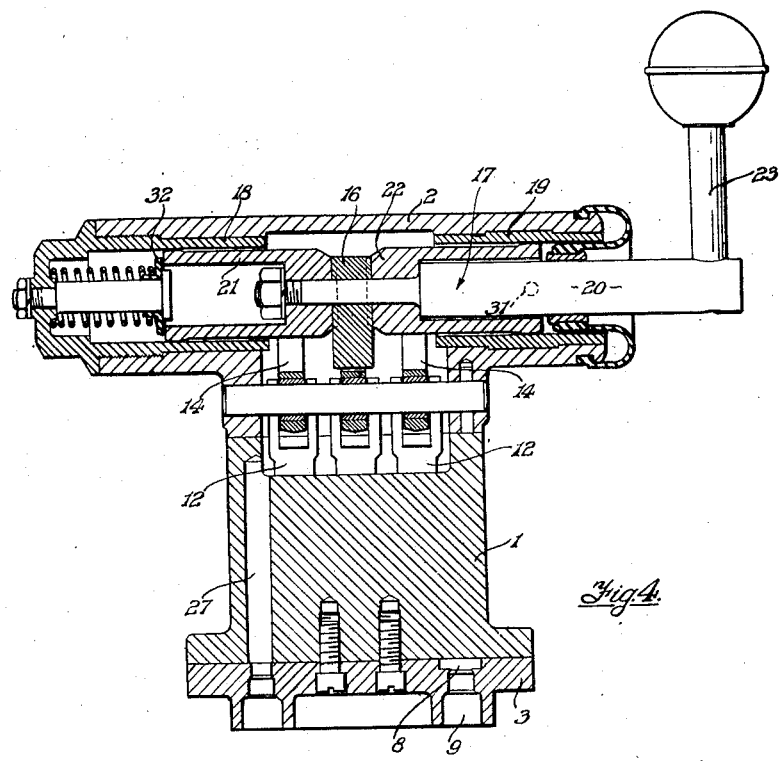
Figure 5:
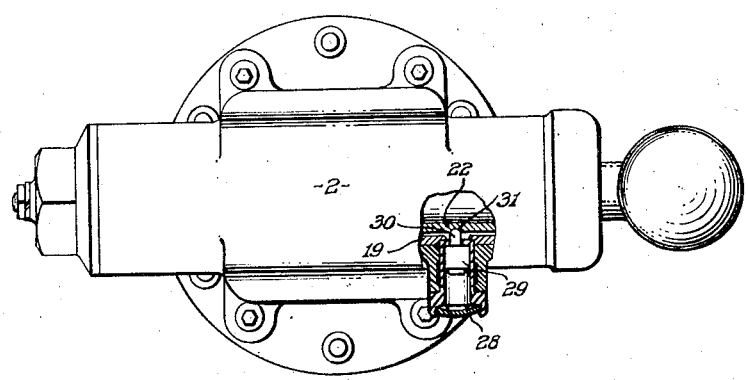

Fig. 1 shows a transverse sectional view of the device in an inoperative condition, Fig. 2 is a view similar to Fig. 1 and showing the device in an operative condition, Fig. 3 is a plan of the base member of the device, Fig. 4 is a longitudinally sectioned elevation of the device, and Fig. 5 is a plan view partly in section.

In the preferred construction illustrated the selector control valve comprises three main units namely a main body portion 1, an upper body member 2, and a fluid distributing base 3.

The main body portion constitutes a unitary valve block containing a plurality of valve bores 4 disposed in two parallel rows of equal number. Each valve bore terminates in a chamber of increased diameter and the plane shoulders 5 thus provided form seats for the disc valves 6 which are normally maintained closed by the supporting springs 7.

The valve chambers are each connected to a common fluid pressure supply duct 8 provided by the recess in the upper joint face of the base member 3, as illustrated in Fig. 3, which is communicated by means of the common inlet port 9, and a suitable conduit, with a source of fluid pressure. The valve bores 4 may conveniently be six in number and are each provided with an outlet port 10 communicated with the outlet connections 11 arranged in the base member 3 for the direction of pressure fluid to the remote mechanism to be actuated.

The required direction of the operating fluid is controlled by the piston type valve elements 12 which are contained one in each valve bore. Each element includes a reduced diameter portion at its lower extremity adjacent the associated disc valve, and the annular chamber 13 thus formed affords a fluid directing passage when the element occupies the operative position taken up by the element 12' as shown in Fig. 2.

The valve elements, each of which are provided with annular fluid sealing rings, extend into the upper body portion 2 and are connected, by means of pins 26 arranged in their forked ends, one to each end of the rocking beams 14. A fixed shaft 15 pivotally supports the beams and extends between and parallel to the rows of valve bores with its end portions contained in housings formed in the upper valve body 2.

At the opposite ends of each of the rocking beams 14 are provided upwardly projecting lobes adapted to co-operate with the extended cam-like striking member 16 which is secured to, and operated by, the selector mechanism indicated generally at 17. This mechanism comprises a composite assembly partially rotatable and axially slidable in the sleeve bearings 18 and 19 contained in the upper valve body and is disposed above and parallel to the axis of the beam shaft 15.

The opposed sleeves 21 and 22 and the interposed member 16 are maintained in alignment by the threaded end portion of the shaft 20, which shaft extends through the open end of the upper valve body and supports the manual displacement member 23. A coil spring is arranged within the sleeve bearing 18 and is adapted, through the intermediary of the slidable collar 32, to bias the selector mechanism toward the central position shown in Figs. 1 and 4.

With the selector mechanism in the neutral or rest position the striker member 16 is aligned with the spaces between the rocker beam lobes and the valve elements remain in equilibrium. The disc valves are maintained against their seats by the supporting springs 7 and the fluid pressure obtaining within the distributor duct 8, and the remote mechanism associated with the outlet ports 10 are thus rendered inoperative.

The selective actuation of any one valve element is effected by axially sliding the selector mechanism until the striker 16 is immediately adjacent the desired element and then rocking the mechanism, by inclining the lever 23, until the striker displaces the associated rocker beam in the manner illustrated in Fig. 2. When depressed the lower end of the operated valve element abuts and displaces its attendant disc-valve and the exhaust passage 24 is thus sealed, while the valve element connected to the opposite end of the beam is raised beyond its normal exhaust position and remains inoperative.

In order to maintain the selector mechanism in its desired operative position without resorting to the use of mechanical locking or detent means the cam face 25 of each lobe is so inclined that the striker 16 takes up an "over-centre" position with respect to the pivot 26 and is thus able to resist the light return force promoted by the fluid pressure obtaining against the full diameter portion of the valve element. Axial displacement of the selector shaft 20 is also prevented by the engagement of the upstanding rocker lobe with the bevelled shoulders formed on the members 21 and 22, while the angular movement of the striker member 16 is limited by the stop afforded by the upstanding lobe.

Further movement of the selector mechanism can therefore only be towards the neutral or rest position previously described and, when so positioned, the pressure fluid previously delivered to the operated remote mechanism is allowed to return through the port 10 and the exhaust passage 24 into the upper valve body member 2 from which it is removed through the passage 27 to atmosphere or, in the case of a hydraulic mechanism, to a liquid reservoir.

The mechanism thus described is particularly suitable for controlling a motor vehicle gearbox of the epicyclic kind in which the gear brake bands are actuated by fluid pressure motors of the spring returned piston type and in this capacity it is desirable to provide suitable warning means to reduce the risk of an operator inadvertently selecting reverse gear during movement of the selector mechanism. For this purpose there is provided a spring loaded detent mechanism 28 arranged in the wall of the upper valve body 2 and comprising a sliding plunger 29 having a round-nosed extension 30 adapted to engage a recess in the sleeve member 22, as indicated at 31 in Fig. 4. The position of this recess with respect to the axial length of the shaft 20 is determined by the position of the shaft when the striker member 16 is immediately adjacent the valve element controlling the reverse gear actuator but, taking the illustrated mechanism as an example, it will be seen that if either of the elements at the extreme left of the mechanism are employed for this purpose movement of the selector mechanism in that direction is opposed by the spring biassed collar 32 and the resultant engagement of the detent mechanism will serve to warn the operator and provide added resistance to angular displacement of the lever 23.

The selector control mechanism provided by the invention has been described, in the interests of clarity, with respect to an even number of remote mechanisms and with particular reference to a remotely controlled gearbox and in order to control a gearbox or any other device having a number of actuators which is less than the number of valve elements contained in the selector mechanism it is necessary to render the excess elements inoperative to avoid the waste of fluid pressure which may arise from operating a valve element the outlet port of which is not connected to an actuator.

For this purpose the valve base distributor member 3 may be replaced with a distributor having a suitable number of outlet connections and a modified fluid pressure distributor duct 8. If for example only five elements are to be employed to control the distribution of fluid pressure the inoperative valve element may conveniently remain within its bore and connected to its beam to maintain a balance thereabout and the duct 8 may be foreshortened to offer a plane sealing surface to the chamber normally occupied by a disc valve assembly.

The selector control valve, when employed for the control of a motor vehicle gearbox or the like may be mounted on, or in close proximity to the gearbox and controlled by extended mechanical means connected to the shaft 20 or alternatively may be mounted for direct control by the operator and communicated to the remote mechanisms by suitable conduit means.

We claim:

1. Control means for selectively actuating reciprocable valve elements comprising a plurality of beams mounted to rock about a common axis and each having a pair of said elements pivotally connected thereto one at each side of said axis, each beam being formed with two projections one at each side of said axis, and a manually-operable control member carrying a cam and mounted for movement along an axis parallel to the axis of said beams to bring said cam selectively into the plane of movement of any one of said beams, said control member being angularly movable to rotate said cam against one or the other of the projections on the respective beam and thereby rock the latter to reciprocate in opposite directions the elements connected thereto.

2. Control means as defined in claim 1, wherein said control member is formed with two axially opposed annular projections disposed one at each side of said cam to receive between them one of the projections of the selected beam and thereby prevent axial movement of said cam away from its position of engagement with the selected beam.

3. Control means as defined in claim 2, wherein said projections on each of said beams are each provided with an inclined surface positioned for engagement by said cam, and each of said surfaces, when engaged by said cam, acts to transmit to said cam reaction from the elements connected to the respective beam to thereby retain the cam against angular displacement from its selected operative position of engagement with said surface.

4. Control means for selectively actuating reciprocable valve elements, comprising a plurality of beams mounted to rock about a common axis and each having a pair of said elements pivotally connected thereto one at each side of said axis, and each beam being formed with two projections spaced in alignment transversely of said axis, one of said projections being located at each side of said axis, and a manually-operable control member carrying a cam movable thereby in either direction from a neutral position, said control member being axially movable, when in the neutral position, along an axis parallel to the axis of said beams and through the spaces between the aligned projections on said beams to bring said cam into the plane of movement of any one of said beams, and said control member being angularly movable to rotate said cam against one or the other of the projections on the respective beam and thereby rock said beam and reciprocate in relatively opposite directions the elements connected thereto.

References Cited in the file of this patent

UNITED STATES PATENTS

| | | |
|---|---|---|
| 1,408,557 | Yarrington | Mar. 7, 1922 |
| 1,487,445 | Dickinson | Mar. 18, 1924 |
| 1,927,700 | Dickinson | Sept. 19, 1933 |
| 2,265,260 | Argo | Dec. 9, 1941 |
| 2,647,536 | Lunde | Aug. 4, 1953 |